Oct. 23, 1951     G. C. VAN KESSEL     2,572,542
DUSTING MACHINE
Filed Nov. 4, 1946     2 SHEETS—SHEET 1
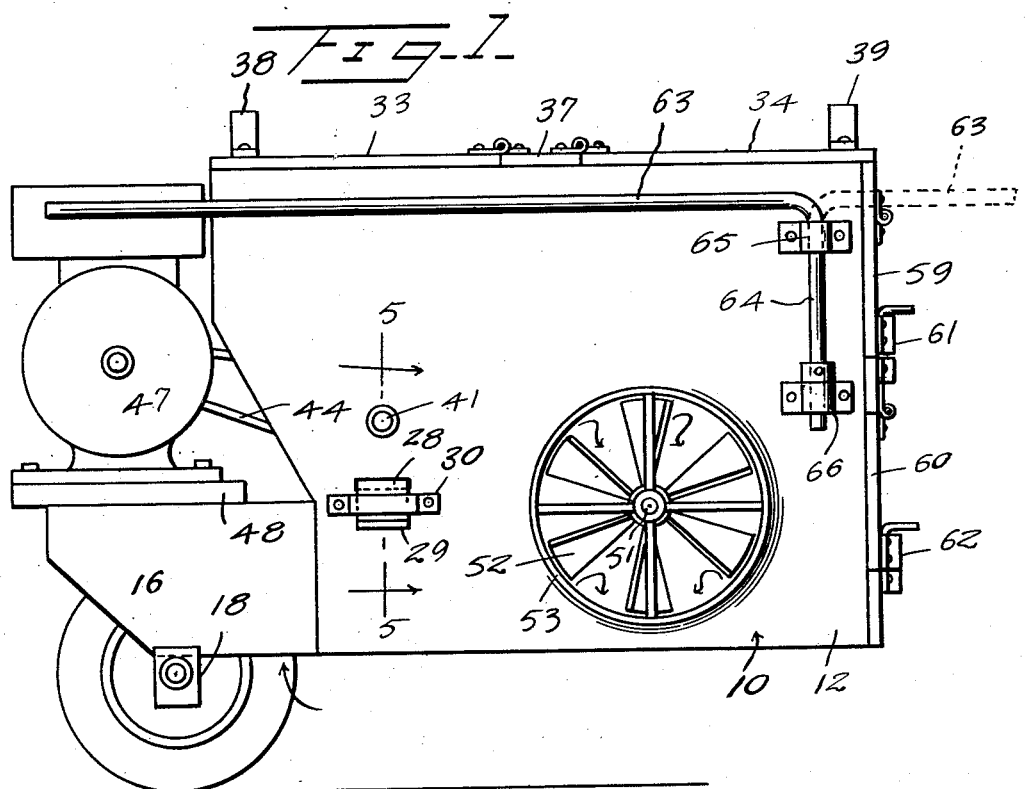
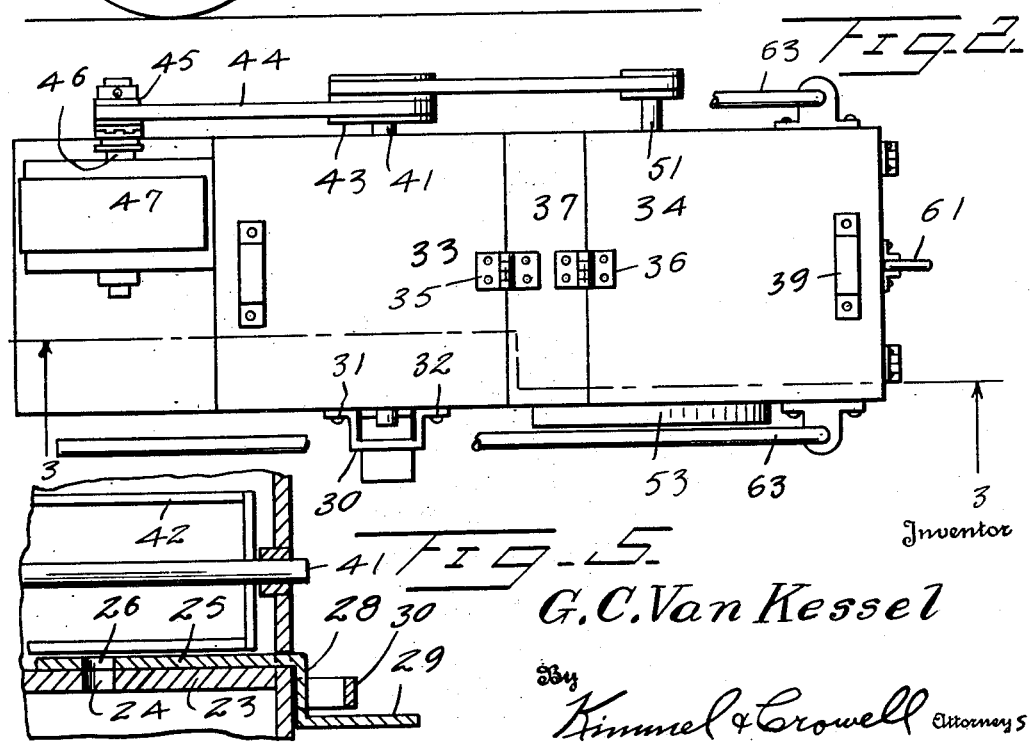
Inventor
G. C. Van Kessel
By Kimmel & Crowell Attorneys Oct. 23, 1951 G. C. VAN KESSEL 2,572,542
DUSTING MACHINE
Filed Nov. 4, 1946 2 SHEETS—SHEET 2
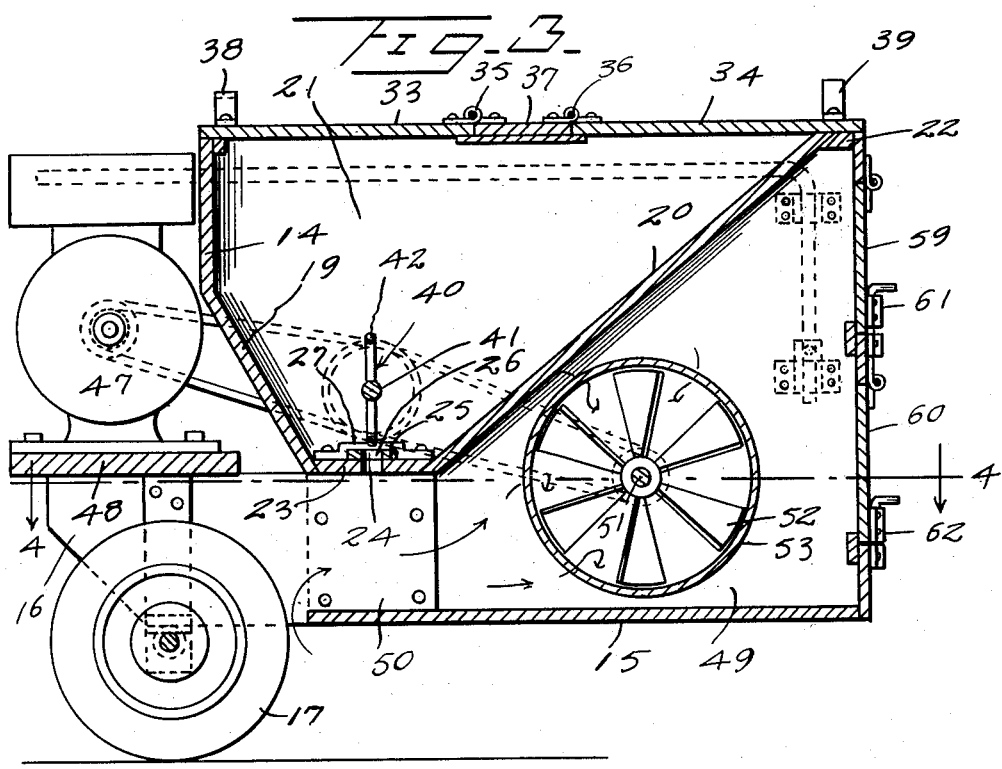
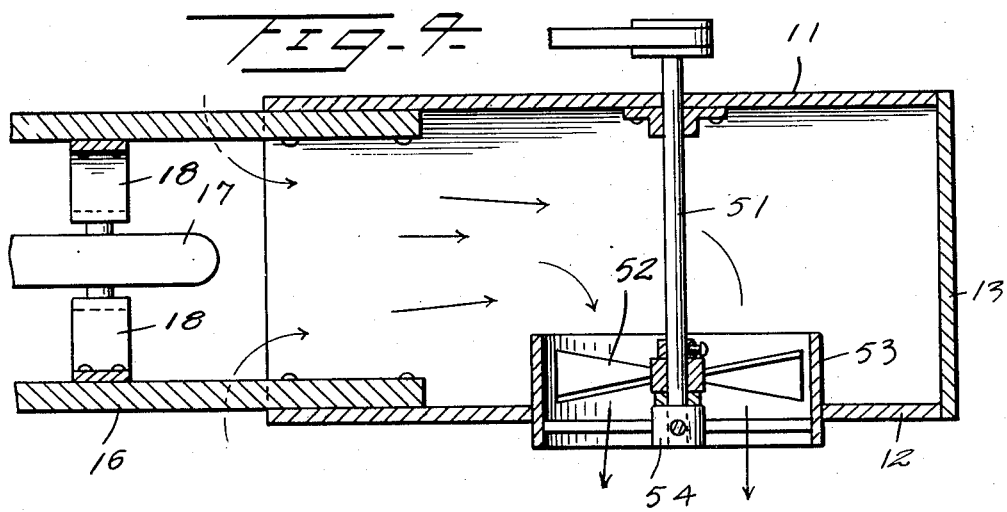
Inventor
G. C. Van Kessel
By Kimmel & Crowell Attorneys Patented Oct. 23, 1951

2,572,542

UNITED STATES PATENT OFFICE 2,572,542

DUSTING MACHINE

George C. Van Kessel, Opa Locka, Fla.

Application November 4, 1946, Serial No. 707,581

1 Claim. (Cl. 43—148)

This invention relates to insecticide distributing devices.

An object of this invention is to provide a portable insecticide dusting machine for spreading insecticide over plants which includes a hopper, a blower mounted in a chamber below the hopper, a rotatable agitator in the hopper, and a valve for regulating the discharge of the insecticide from the hopper to the blower chamber.

Another object of this invention is to provide a duster of this kind wherein the insecticide is discharged laterally of the movement of the device.

A further object of this invention is to provide a duster of this kind which is of simple construction so that it can be manufactured at low cost.

With the above and other objects in view, my invention consists in the arrangement, combination and details of construction disclosed in the drawings and specification, and then more particularly pointed out in the appended claim.

In the drawings,

Figure 1 is a detail side elevation of an insecticide duster constructed according to an embodiment of this invention, Figure 2 is a plan view of the device, Figure 3 is a sectional view taken on the line 3—3 of Figure 2, Figure 4 is a fragmentary sectional view taken on the line 4—4 of Figure 3, Figure 5 is a fragmentary sectional view taken on the line 5—5 of Figure 1.

Referring to the drawings, the numeral 10 designates generally a housing which is formed of opposite side walls 11 and 12, end walls 13 and 14, and a bottom wall 15. The side walls 11 and 12 have projecting forwardly therefrom a pair of wheel supporting members 16 between which a wheel 17 is rotatably mounted. The wheel 17 is rotatably supported from brackets or axle supporting members 18 which are fixed between the supporting members 16. The housing 10 has mounted between the side walls 11 and 12 thereof, downwardly convergent walls 19 and 20 which form a hopper 21. The wall 20 is substantially longer than the wall 19, extending downwardly and inwardly from a short top wall 22.

A bottom hopper wall 23 is fixed between the convergent lower ends of the hopper walls 19 and 20 and is formed with at least one opening 24. A valve plate 25 which is formed with a port or opening 26 is slidable through the side wall 12 and is guided by means of a guide 27 fixed to the inner side of the hopper bottom wall 23. The valve member 25 is formed at its outer end with a downturned extension 28 and a horizontal handle or extension 29 extends from the vertical extension 28. A U-shaped stop member 30 formed with oppositely extending flanges 31 is fixed by fastening means 32 to the outer side of the side wall 12 and is disposed in a position straddling the vertical extension 28 so that when the handle 29 is pulled outwardly the U-shaped member 30 will limit the outward movement thereof to closed position. The hopper 21 is adapted to be closed by means of a pair of hinged closure members 33 and 34 which are hinged as at 35 and 36 respectively to a transversely extending bar 37 extending between the upper portions of the side members 11 and 12.

Handles 38 and 39 are fixed to and extend upwardly from the closures 33 and 34. An agitator generally designated as 40 is rotatably mounted in the lower portion of the hopper 21 and includes an agitator shaft 41, having fixed thereto oppositely disposed U-shaped agitator members 42. The shaft 41 is journaled through the side members 11 and 12 and has mounted on one end thereof a pulley 43 about which a belt 44 is trained. The belt 44 is also trained about a driving pulley 45 on the motor shaft 46 which is driven by means of a power member 47. The power member 47 is mounted on the platform 48 secured between the wheel supporting members 16 at the forward end of the housing 10.

The hopper walls 20 and 23 form chambers 49 and 50 in the lower portion of the housing 10, the chamber 50 being open to the atmosphere at the forward end of the housing and disposed below the discharge port opening 24. The chamber 49 has journaled thereacross a blower shaft 51. The shaft 51 has mounted thereon a blower blade structure 52 which rotates within a cylindrical housing 53 fixed in the side wall 12 and open at its inner and outer ends. A shaft bearing 54 is supported within the cylindrical member 53 by means of supporting bars 55. The air entering the chambers 50 and 49 is adapted to move along the path indicated by the arrows in Figures 3 and 4. The shaft 51 at one end thereof, has secured thereto a pulley 56 about which a belt 57 is trained. A second pulley 58 is mounted on the agitator shaft 41 so that the blower will be rotated upon rotation of the agitator shaft 41.

The rear wall 13 of the housing 10 is preferably formed with upper and lower closures 59 and 60 which may be locked in closed position by latching members 61 and 62 respectively. In order to provide means whereby the housing may be moved over on the ground, I have provided a pair of elongated handles 63 which are formed at their inner ends with right angular extensions 64 rotatably carried by bearings 65 and 66 which are fixed to the outer sides of the side walls. The handles 63 may be swung forwardly and inwardly to the full line position shown in Figure 1 when the device is stationary and at this time a supporting block or other element may be placed beneath the rear of the housing. When the device is operating over the ground and is in operation, the handles 63 are swung outwardly and rearwardly to the dotted line position shown in Figure 1.

In the use and operation of this duster, the insecticide is placed in the hopper 21 by opening either one or both of the closures 33, 34. The motor or engine 47 is operated to rotate the agitator shaft 41 and also the blower shaft 51. The agitator 40 will keep the insecticide against packing in the lower portion of the hopper so that the material will be discharged through the valve opening 26 and discharge opening 24, when the valve is in the open position as shown in Figure 5. Air will be drawn into the intake chamber 50 by rotation of the fan blades 52 and the incoming air will draw downwardly the insecticide discharged through the openings 26 and 24. The combined air and insecticide will then be blown laterally through the tubular housing 53. Inasmuch as the housing 10 is manually supported from the rearwardly extended handles 63, the height of the ejection of the insecticide may be manually regulated, depending on the position of the housing 53. This machine has been designed for discharging powdered insecticide on plants and will dust a very substantial area as the device is moved over the surface of the ground.

The drive shaft 46 is adapted to be clutched to pulley 45 by means of a conventional clutch here shown as complementary toothed clutch elements not numbered so that the agitator and blower may be rendered inoperative at will.

What I claim is:

An insecticide duster comprising a housing formed of opposite sides, opposite ends and a bottom wall, a pair of downwardly convergent inner walls between said sides dividing said housing into a hopper and a mixing chamber, said mixing chamber having an air intake opening in the forward end thereof, an apertured horizontal wall at the lower end of said hopper, an apertured valve plate slidably engaging said apertured wall, a rotatable agitator journalled between said sides and disposed above said valve plate, a hollow open ended tubular member secured in one side of said mixing chamber rearwardly of said intake opening, a fan rotatably disposed in said tubular member adapted upon operation thereof to blow air and insecticide from said mixing chamber exteriorly of said housing, a traction wheel at the forward end of said housing, means supporting said wheel midway between planes of the sides of said housing, a power member, means supporting said power member above said wheel and forwardly of the axis of the latter whereby said power member will substantially balance said housing on said wheel, an operative connection between said power member and said agitator and fan, and a pair of handles carried by said housing.

GEORGE C. VAN KESSEL.

REFERENCES CITED

The following references are of record in the file of this patent:

UNITED STATES PATENTS

| Number | Name | Date |
|---|---|---|
| 1,043,673 | Covington | Nov. 5, 1912 |
| 1,207,316 | Montague | Dec. 5, 1916 |
| 1,750,147 | Wright | Mar. 11, 1930 |
| 1,785,945 | Ezdorf et al. | Dec. 23, 1930 |
| 1,829,298 | Rimedio | Oct. 27, 1931 |
| 1,948,668 | Kuchler | Feb. 27, 1934 |
| 2,193,338 | Magnuson | Mar. 12, 1940 |
| 2,425,419 | Carnes | Aug. 12, 1947 |

FOREIGN PATENTS

| Number | Country | Date |
|---|---|---|
| 322,074 | Italy | Oct. 26, 1934 |